April 8, 1941.   W. I. RUSCHE   2,237,607
WARNING SIGNAL
Filed Aug. 17, 1938

William I. Rusche
INVENTOR

BY Victor J. Evans & Co.
ATTORNEYS

Patented Apr. 8, 1941

2,237,607

UNITED STATES PATENT OFFICE 2,237,607

WARNING SIGNAL

William I. Rusche, Cincinnati, Ohio

Application August 17, 1938, Serial No. 225,455

1 Claim. (Cl. 200—59)

This invention relates to warning signals and has for an object to provide an electrically operated signal for awakening a drowsy driver of a motor vehicle when he relaxes sufficiently to take his hands off of the steering wheel.

A further object is to provide a novel helical spring guide adapted to be loosely mounted on the steering column and to rotate as a unit with the steering wheel to pay off and wind up the circuit wires when the steering wheel is turned through two revolutions more or less in making a sharp change of direction.

A further object is to provide a novel steering wheel switch having a shell carrying a spring switch contact and telescopically mounted upon a switch box to be pressed inwardly by closing of the driver's grip thereon to disengage said contact from a mating switch contact to normally hold the alarm circuit open while the driver is gripping the steering wheel, the spring contact being adapted to immediately force the shell outward to close the alarm circuit the moment the driver releases his grip from the steering wheel and shell.

A further object is to provide a warning signal of this type which will be formed of a few strong simple and durable parts, which will be inexpensive to manufacture and install and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1:
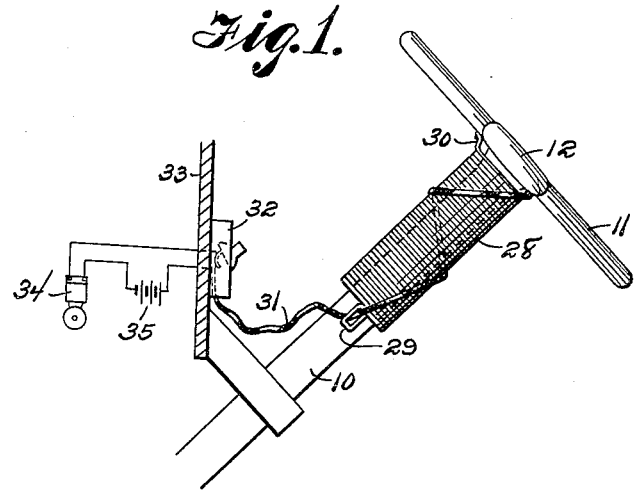
Figure 1 is a side elevation of warning signal apparatus constructed in accordance with the invention.
Figure 2:
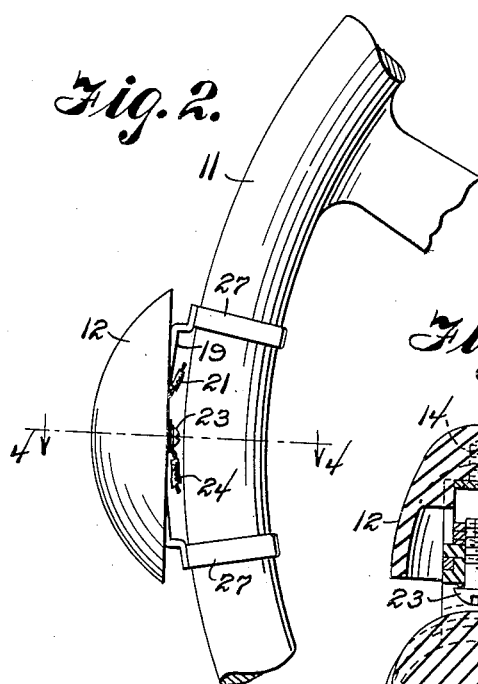
Figure 2 is an enlarged plan view showing the steering wheel switch.

Referring now to the drawing in which like characters of reference designate similar parts in the various views, 10 designates a steering column, and 11 the steering wheel of conventional type. In carrying out the invention a steering wheel switch is provided comprising an elongated concave shell 12 formed of insulating material and adapted to be mounted on the rim of the steering wheel 11 in such position that when the driver assumes his natural driving position his hands will encircle the rim of the wheel and the shell, there being two switches employed although only one is illustrated.

Figure 3:
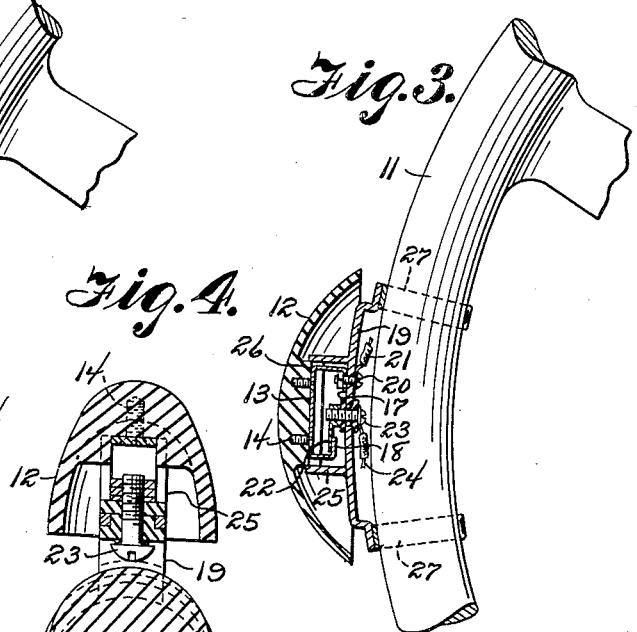
Figure 3 is a longitudinal sectional view of the steering wheel switch in circuit closing position.

A substantially U-shaped spring switch contact 13 is secured to the inner surface of the shell through the medium of screws 14 or other connectors and both legs of the contact are bent inwardly as shown at 17 and 18 in Figure 3. The inwardly bent end 17 is secured to a strap 19 through the medium of a bolt 20 or other connector which forms a binding post to which is attached one of the circuit wires 21 of the alarm circuit. A switch contact 22 is secured to the strap 19 through the medium of the screw 23 which also forms a binding post to which is attached the other circuit wire 24 of the warning circuit. A box 25 is formed integral with the strap 19 and slidably receives a projection 26 on the inner face of the shell 12.

Figure 4:
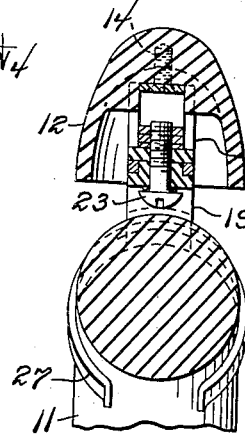
Figure 4 is a cross sectional view taken on the line 4—4 of Figure 2.

As best shown in Figure 4 the ends of the strap are equipped with resilient split ring clamps 27. These clamps embrace the rim of the steering wheel 11 at spaced points to adjustably secure the switch to the steering wheel.

By now referring to Figure 1 it will be seen that a helical coil spring 28 is sleeved upon the steering column 10 and is provided at the lower end with a guide eye 29. The upper end of the coil spring is secured to the steering wheel through the medium of a strap bracket 30 so that the coil spring rotates as a unit with the steering wheel. The cable 31 which houses the circuit wires 21 and 24 is looped around the coil spring and trained through the eye 29 and thence is connected to a master switch 32 on the instrument board 33 within convenient reach of the driver. When the wheel is turned through two revolutions more or less in making a sharp turn the convolutions of the spring 28 will wind up and pay off the cable 31 so that the same cannot become tangled or interfere with the driver's movements.

A warning bell 34 is connected to the master switch 32 and is connected to the battery 34. The bell may be placed in any desired location.

In operation as long as the driver's grip is closed upon the shells of the steering wheel switches the shells will be pressed inwardly and the contacts 18 and 22 held in open circuit position. Should the driver become drowsy and release his grip the spring contacts 13 immediately force the shells 12 outwardly and move the contacts 18 and 22 into circuit closing position to close the circuit through the bell and sound a warning to awaken the driver.

From the above description it is thought that the construction and operation of the invention will be fully understood without further explanation.

What is claimed is:

A steering wheel switch comprising, a strap adapted to be secured to and extend longitudinally of a steering wheel rim on the outer side thereof, a guide box projecting from the strap open at the outer side, binding posts carried by the strap within the box, an elongated shell extending longitudinally of the outer side of the strap to fit within the palm of a driver's hand closed upon the steering wheel while driving, a guide projection formed integral with the shell and slidably fitting within the guide box, a substantially U-shaped spring switch contact disposed longitudinally of the projection, screws securing the contact to the projection between the legs of the contact, one leg of the contact being secured to one of said binding posts, and a fixed switch contact carried by the other binding post held in engagement with the other leg of the spring switch contact by the resiliency of the spring switch contact, the arrangement being such that in normal driving position the shell is held within the driver's hand which grasps the steering wheel and compresses the spring switch contact to open circuit position with relation to the fixed contact but when the driver releases his grip from the steering wheel through drowsiness or other cause the resiliency of the spring switch contact moves the shell and spring switch contact to closed circuit position with relation to the fixed switch contact.

WILLIAM I. RUSCHE.